(12) United States Patent
Blethen

(10) Patent No.: US 6,572,358 B1
(45) Date of Patent: Jun. 3, 2003

(54) DIE ASSEMBLY FOR FORMING A BEAD ON A CYLINDRICAL TUBE

(75) Inventor: Karl Jay Blethen, Manchester, MI (US)

(73) Assignee: Pilot Industries, Inc., Dexter, MI (US)

( * ) Notice: Subject to any disclaimer, the term of this patent is extended or adjusted under 35 U.S.C. 154(b) by 0 days.

(21) Appl. No.: 10/003,140

(22) Filed: Nov. 15, 2001

(51) Int. Cl.[7] ............................................... B29C 57/04
(52) U.S. Cl. ........................... 425/393; 425/DIG. 218; 264/296
(58) Field of Search .................. 425/393, 392, 425/DIG. 218; 264/296, 322; B29C 57/04

(56) References Cited

U.S. PATENT DOCUMENTS

| | | | | |
|---|---|---|---|---|
| 4,150,087 A | * | 4/1979 | de Putter et al. | 425/393 |
| 4,316,870 A | * | 2/1982 | Rowley | 425/393 |
| 4,383,966 A | * | 5/1983 | Svetlik | 425/393 |
| 4,406,852 A | * | 9/1983 | Riegel | 425/DIG. 218 |

* cited by examiner

Primary Examiner—Robert Davis
Assistant Examiner—Thu Khanh T. Nguyen
(74) Attorney, Agent, or Firm—Gifford, Krass, Groh, Sprinkle, Anderson & Citkowski, P.C.

(57) ABSTRACT

A die assembly is disclosed for forming a bead on a cylindrical tube. The assembly includes a holder which secures the tube against axial movement so that a portion of the tube protrudes outwardly from the holder along a predetermined axis and in which the holder has a forming surface circumscribing the tube. The die assembly further includes a first die part having a cylindrical mandrel aligned with and slidably receivable into the outwardly protruding portion of the tube. A tubular cylindrical sleeve is mounted to the first die part so that the sleeve is coaxial with the mandrel and so that the tube extends between the mandrel and the sleeve. The sleeve also includes a conical surface coaxially formed about a free end of the sleeve. A second die part has a throughbore complementary in size and shape to the outer periphery of the sleeve so that the sleeve is slidably receivable within the throughbore. This second die part is movable between an extended position in which the sleeve is aligned with the second die part throughbore and a first position in which the sleeve extends at least partially into the second die part throughbore.

6 Claims, 3 Drawing Sheets

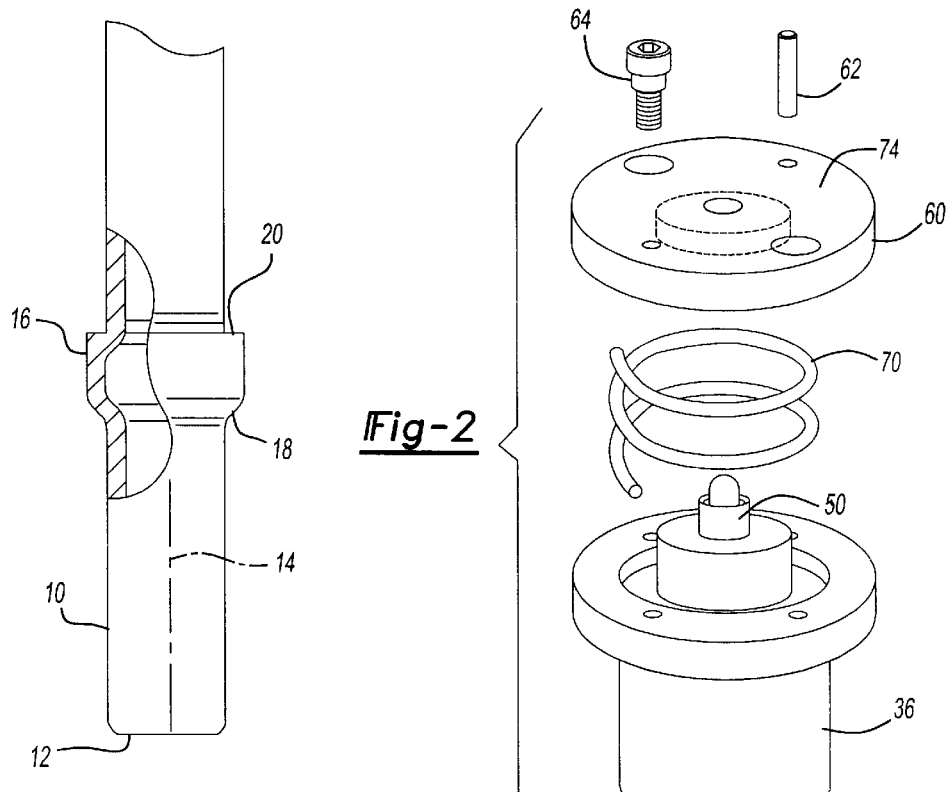
Fig-1
Fig-2
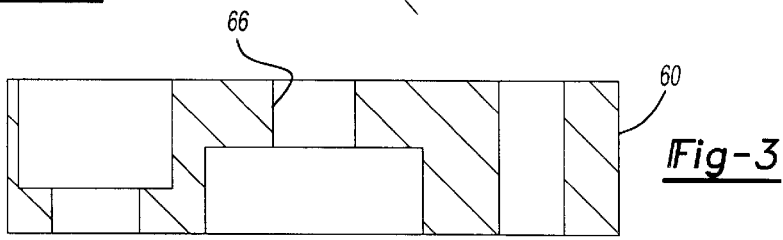
Fig-3
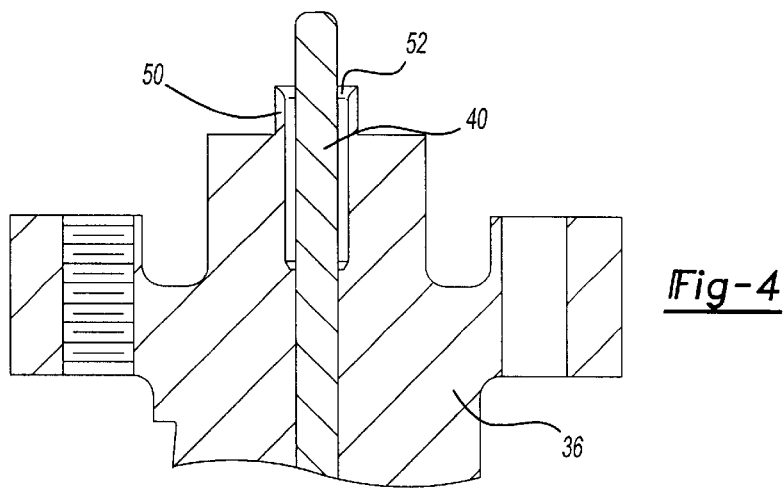
Fig-4

DIE ASSEMBLY FOR FORMING A BEAD ON A CYLINDRICAL TUBE

BACKGROUND OF THE INVENTION

I. Field of the Invention

The present invention relates to a die assembly for forming a bead on a tube.

II. Description of Related Art

There are many applications in which a bead is formed adjacent a free end of the tube. Such beads have an outside diameter greater than the diameter of the tube and such beads are utilized to secure the tube to both flexible hoses as well as to quick connect couplings.

In order to form the bead on the tube, it has been previously known to utilize a die assembly to radially deform and expand the tube to form the bead. These previously known die assemblies typically comprise a holder secured to the tube to prevent axial movement of the tube relative to the holder. A die having a mandrel slidably received within the interior of the tube was aligned with the holder while forming surfaces corresponding to the desired shape of the bead were formed on both the holder as well as the die.

In order to form the bead, the holder and die were moved together thus radially outwardly expanding the tube into the forming surfaces formed on both the holder and the die. In doing so, the forming surface on the die would deform the surface of the bead axially closest to the free end of the tube while, conversely, the forming surface on the holder would form the opposite axial end of the bead.

These previously known die assemblies for forming beads on tubes, however, have not proven wholly satisfactory in operation. One disadvantage of these previously known die assemblies is that during the process of outwardly deforming the tube to form the bead, the outer periphery of the tube between the die and the holder was unconstrained. This, in turn, permitted the tube to radially deform outwardly in an irregular fashion such that it was not possible to maintain close tolerances in the shape or size of the bead.

A still further disadvantage of these previously known die assemblies for forming beads is that, since the outer periphery of the bead between the holder and the die was unconstrained, burrs would form on the outer surface of the bead during the deformation process. Such burrs, however, are unacceptable in many applications and thus require an additional deburring operation to remove the burrs before the tubes can be used in production. Such a deburring process, however, adds both time and cost to the manufacturing process.

SUMMARY OF THE PRESENT INVENTION

The present invention provides a die assembly for forming a bead on a tube which overcomes all of the above-mentioned disadvantages of the previously known devices.

In brief, the die assembly of the present invention comprises a holder which secures the tube against axial movement to the holder such that a portion of the tube protrudes outwardly from one side of the holder along a predetermined axis. This holder, furthermore, includes a forming surface which circumscribes the tube as the tube protrudes outwardly from the holder. In practice, this forming surface is preferably a surface which extends radially outwardly from the tube in a plane generally perpendicular to the tube axis.

The die assembly further comprises a first die part having a cylindrical mandrel with an outside diameter substantially the same as the inside diameter of the tube. Furthermore, the mandrel is coaxially positioned with the predetermined axis and is slidably receivable within the outwardly protruding portion of the tube.

A tubular and cylindrical sleeve is also mounted to the first die so that the sleeve is coaxial with the mandrel. The sleeve has an inside diameter substantially the same as the outside diameter of the tube so that the tube extends between the sleeve and the mandrel. The sleeve also includes a predetermined outer periphery as well as a conical surface coaxially formed around the free end of the sleeve and thus coaxially around the tube.

A second die part has a throughbore complementary in both shape and size to the outer periphery of the sleeve. This second die part is slidably mounted to the first die part along the predetermined axis and is movable between an extended position and a retracted position relative to the first die part. In its extended position, the sleeve is aligned with the second die part throughbore while in its retracted position, the sleeve extends at least partially into the throughbore of the second die part. A spring is disposed between the first and second die parts to resiliently urge the second die part to its extended position.

Any conventional actuator is utilized to secure the tube and move the holder relative to the first die part along the predetermined axis between the first position and the second position. In its first position, the holder abuts against the second die part while the second die part is in its extended position. Conversely, as the holder is moved to its second position relative to the first die part, the holder moves the second die part to its retracted position thus radially outwardly deforming the bead between the forming surface in the holder and the conical surface on the sleeve. Furthermore, since the throughbore formed in the second die part circumscribes and constrains the tube around the bead during the entire formation of the bead, and also since the holder remains in contact with the second die part during the entire deformation process, the bead is not only accurately formed on the tube, but the possibility of a burr forming between the holder and the second die part is altogether eliminated.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a fragmentary sectional view illustrating a tube having a bead formed by the die assembly of the present invention;

FIG. 2 is an exploded view of a portion of the preferred embodiment of the present invention;

FIG. 3 is a longitudinal sectional view illustrating a portion of the preferred embodiment of the present invention;

FIG. 4 is a longitudinal sectional view illustrating a further portion of the preferred embodiment of the present invention;

DETAILED DESCRIPTION OF A PREFERRED EMBODIMENT OF THE PRESENT INVENTION

Figure 5:
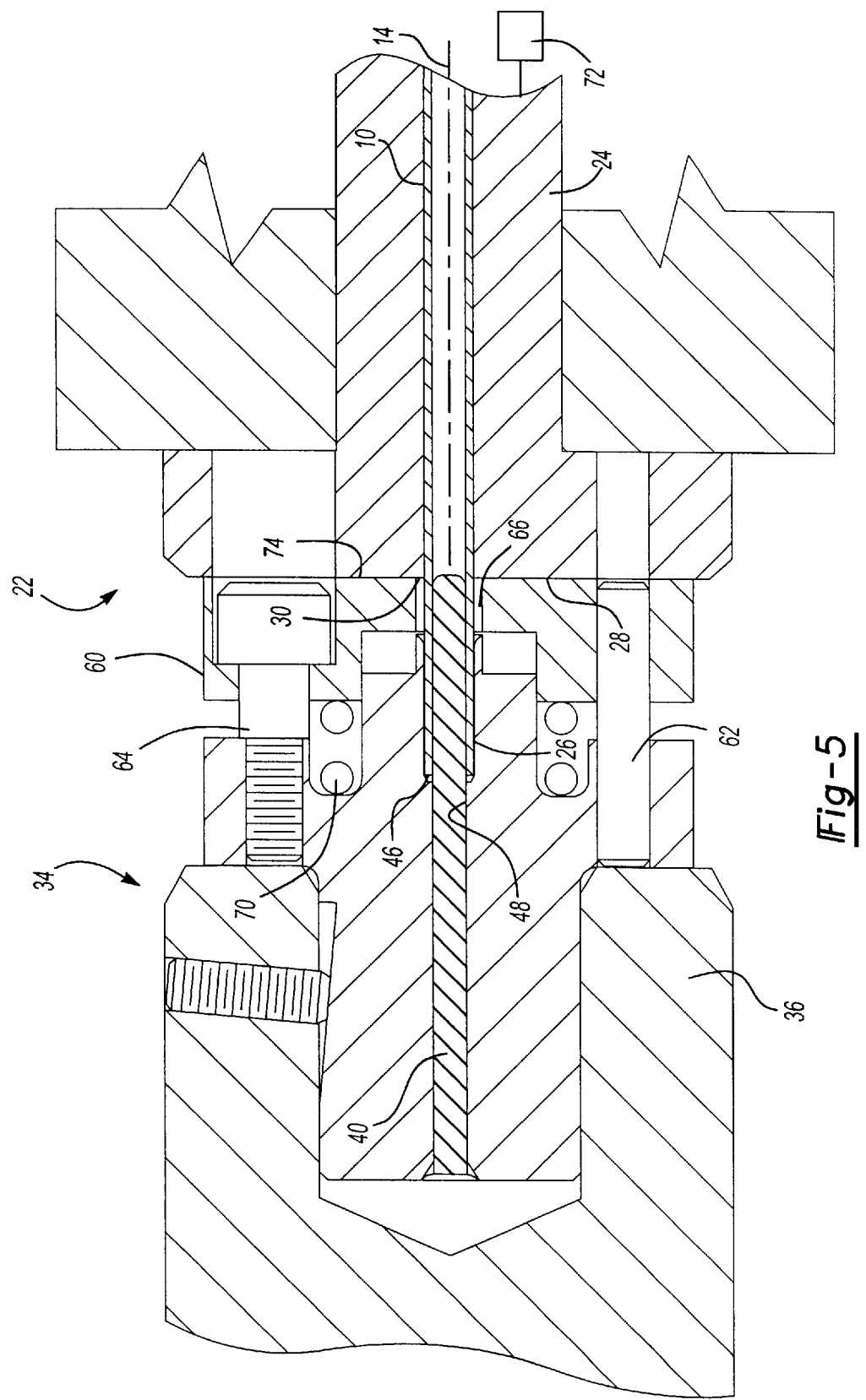
FIG. 5 is a longitudinal sectional view illustrating the preferred embodiment of the present invention just prior to forming a bead.

With reference first to FIG. 1, a tube 10 having a free end 12 and a longitudinal axis 14 is illustrated. A bead 16, which is formed in a fashion to be subsequently described in greater detail, is formed on the tube 10 at a position spaced from the tube end 12. The bead 16 has an enlarged diameter with respect to the diameter of the tube 10 and is used for connection of the tube 10 to a conduit, quick connect coupling or the like.

Still referring to FIG. 1, the bead 16 includes both a distal axial end 18 which is substantially conical in cross-sectional shape. A proximal end 20 of the bead 16, conversely, is relatively flat in shape lying in a plane substantially perpendicular to the tube axis 14.

With reference now to FIG. 5, a preferred embodiment of a die assembly 22 is shown for forming the bead 16 on the tube 10. The die assembly 22 comprises a holder 24 utilizing any conventional means to hold the tube 10 to the holder 24 against axial movement and so that a portion 26 of the tube protrudes radially outwardly from one end 28 of the holder 24. Furthermnore, an annular forming surface 30 on the holder 24 circumscribes the tube 10 and lies in a plane substantially perpendicular to the tube axis 14.

Still referring to FIG. 5, the die assembly 22 further comprises a die 34 having a first die part 36 and a second die part 60. As best shown in FIGS. 2, 4, and 5, the first die part 36 includes a cylindrical mandrel 40 which is aligned with the axis 14 of the tube 10. The mandrel 40, furthermore, includes an outside diameter substantially the same or slightly less than the inside diameter of the tube 10 so that the mandrel 40 is slidably received within the interior of the outwardly protruding portion 26 of the tube 10 as shown in FIG. 5. Furthermore, with the mandrel 40 positioned within the tube 10 as shown in FIG. 5, a free end 46 of the tube 10 abuts against an abutment surface 48 on the first die part 36 so that the outwardly protruding portion 26 of the tube 10 is axially displaced in unison with axial displacement of the first die part 36 relative to the holder 24.

Referring now particularly to FIGS. 4 and 5, the first die part 36 further includes a sleeve 50 having an inside diameter substantially the same or slightly greater than the outside diameter of the tube 10. The sleeve 50 is coaxially disposed around the mandrel 40 so that, with the mandrel 40 positioned within the tube 14 as shown in FIG. 5, the sleeve 50 circumscribes a portion of the outwardly protruding portion 26 of the tube 10.

As best shown in FIG. 4, the sleeve 40 further includes an outwardly flared conical surface 52 at its free end. This conical surface 52 constitutes the forming surface for the distal end 18 (FIG. 1) of the bead 16 and thus corresponds in shape to the distal end 18 of the bead 16.

With reference now particularly to FIGS. 2, 3 and 5, the die 34 further includes a second die part 60 which is axially slidably mounted to the first die part 36 by guide pins 62 (only one shown) and fasteners 64 (only one shown) so that the second die part 60 is axially slidably mounted relative to the first die part 36 along the tube axis 14. The second die part 60 also includes a throughbore 66 which is aligned with the sleeve 50 on the first die part 36. Furthermore, the throughbore 66 is of a complementary size and shape, preferably cylindrical, as the outer periphery of the sleeve 50 so that the sleeve 50 is slidably received through the throughbore 66 on the second die part 60.

Figure 6:
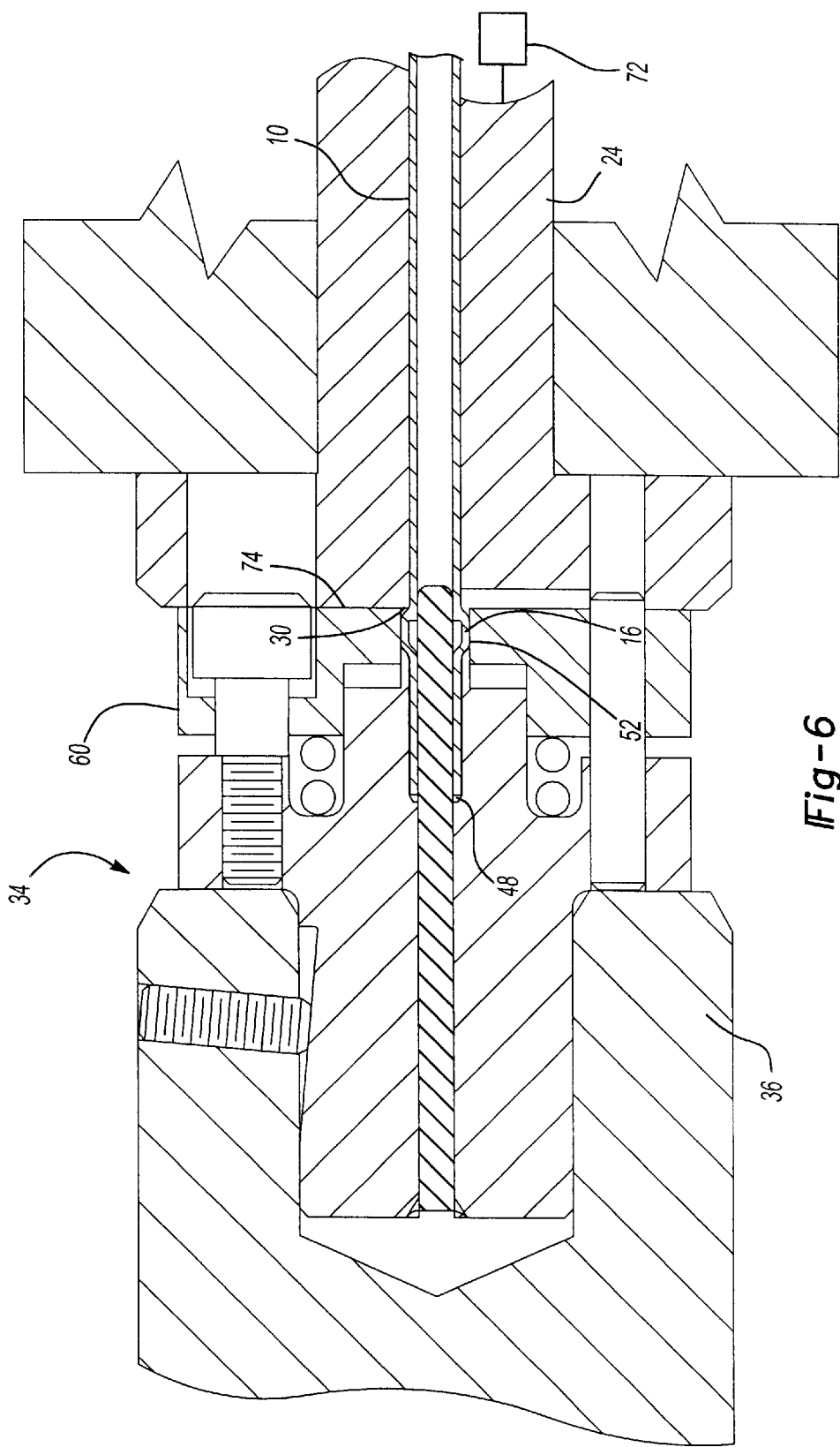
FIG. 6 is a view similar to FIG. 5, but illustrating the preferred embodiment of the present invention at the completion of a bead forming process.

With reference now to FIGS. 5 and 6, the second die part 60 is movable relative to the first die part 36 between an extended position, illustrated in FIG. 5, and a retracted position, illustrated in FIG. 6. In its extended position (FIG. 5) the second die part 60 is axially spaced from the first die part 36 and so that the sleeve 50 on the first die part 36 is just slightly positioned within the throughbore 66 of the second die part 60. Conversely, in its retracted position (FIG. 6) the second die part 60 is compressed against the first die part 36 and a greater portion of the sleeve 50 is axially positioned within the interior of the second die part throughbore 66. A spring 70 (FIGS. 2 and 5) normally urges the second die part 60 to its extended position.

With reference now to FIGS. 5 and 6, an actuator 72, illustrated only diagrammatically, is connected to the holder 24 to axially displace the holder 24 relative to the first die part 36 along the axis 14 between a first position, illustrated in FIG. 5, and a second position, illustrated in FIG. 6. The actuator 72 may be of any conventional construction, such as a pneumatic, electric, hydraulic or other type of actuator. Alternatively, the actuator 72 may be mechanically connected to the first die part 36 to move the first die part 36 along the axis 14 while the holder is stationary. Optionally, the holder 24 and first die part 36 may be simultaneously moved along the axis 14.

With the holder 24 in its first position (FIG. 5), the second die part 60 is in its extended position and the end 28 of the holder 24 flatly abuts against an outwardly extending axial surface 74 of the second die part 60. At this time, the mandrel 40 is positioned within the outwardly protruding portion 26 of the tube 10 while the free end 46 of the tube 10 abuts against the abutment surface 48 formed in the first die part 36. At this time, i.e. at the beginning of the bead forming process, the tube 10 is not in a state of axial compression.

With reference now to FIG. 6, upon actuation of the actuator 72, the holder 24 moves relative to the first die part 36 to its second position in which the holder 24 simultaneously moves the second die part 60 to its second position. In doing so, the outwardly protruding portion 26 of the tube 10 is subjected to axial compression between the abutment surface 48 on the first die part 36 and the holder 24. This axial compression causes the tube 10 to expand radially outwardly thus forming the bead 16 between the conical forming surface 52 on the sleeve 50, the annular forming surface 30 on the holder 24 and the throughbore 66 of the second die part 60.

After the bead is formed in the above-identified fashion, the die 34 is separated from the holder 24, the tube 10 removed from the holder 24 and a new unformed tube 10 positioned within the holder 24. The above process is then repeated.

A primary advantage of the present invention is that the holder 24 is in contact with the outer face 74 of the second die part 60 during the entire forming process of the bead 16. This contact between the holder 24 and the second die part 60 eliminates the possibility of any burr being formed at the proximal end 20 (FIG. 1) of the bead 16 by metal from the tube 10 being trapped between the holder 36 and the second die part 60 during the forming operation.

From the foregoing, it can be seen that the present invention provides a simple and yet effective die assembly for forming beads on tubes. Having described my invention, however, many modifications thereto will become apparent to those skilled in the art to which it pertains without deviation from the spirit of the invention as defined by the scope of the appended claims.

I claim:

1. A die assembly for forming a bead on a cylindrical tube comprising:

a holder, which secures the tube against axial movement and so that a portion of the tube protrudes outwardly from said holder along a predetermined axis, said holder having a first forming surface circumscribing said tube;

a first die part;

a cylindrical mandrel mounted on said first die part, said mandrel having an outside diameter substantially the same as an inside diameter of the tube, said mandrel being aligned with said predetermined axis and slidably receivable into said outwardly protruding portion of the tube;

a tubular cylindrical sleeve mounted to said first die part so that said sleeve is coaxial with said mandrel, said sleeve having an inside diameter substantially the same as the outside diameter of the tube and a predetermined outer periphery, said sleeve having a second forming surface coaxially formed around a free end of said sleeve, a second die part having a throughbore complementary in size and shape to said sleeve outer periphery, said second die part being slidably mounted to said first die part along said predetermined axis and movable between an extended position in which said sleeve is aligned with said second die part throughbore and a retracted position in which said sleeve extends at least partially into said second die part throughbore;

a spring, which resiliently urges said second die part towards said extended position; and means for moving said holder relative to said first die part along said predetermined axis between a first position in which said second die part is in said extended position, and a second position in which said second die part is in said retracted position to thereby form the bead between said first forming surface and said second forming surface.

2. The invention as defined in claim 1 wherein said holder includes an end surface coplanar with said first forming surface, said holder end surface flatly abutting against an end of said second die part when said holder is in said first position.

3. The invention as defined in claim 1 and comprising at least one guide pin secured to said first die part, said guide pin being slidably received within a bore in said second die part.

4. The invention as defined in claim 2 wherein said first forming surface and said holder end surface both lie in a plane perpendicular to said predetermined axis.

5. The invention as defined in claim 1 wherein said first die part comprises an abutment surface in abutment with a free end of the tube.

6. The invention as defined in claim 1 wherein said second forming surface is conical in shape.

* * * * *